US006882706B2

(12) United States Patent
Andrew

(10) Patent No.: US 6,882,706 B2
(45) Date of Patent: Apr. 19, 2005

(54) METHOD AND SYSTEM OF PROVIDING EMERGENCY DATA

(75) Inventor: Felix G. T. I. Andrew, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 53 days.

(21) Appl. No.: 09/999,002

(22) Filed: Oct. 23, 2001

(65) Prior Publication Data

US 2003/0076932 A1 Apr. 24, 2003

(51) Int. Cl.[7] .............................................. H04M 11/04
(52) U.S. Cl. ....................... 379/45; 379/90.01; 455/566
(58) Field of Search ............................... 379/37, 38, 40, 379/41, 42, 43, 44, 45, 90.01, 88.13, 88.17, 93.23, 93.24, 93.25, 218.01, 201.04, 201.05; 455/564, 566

(56) References Cited

U.S. PATENT DOCUMENTS

| 5,483,586 A | * | 1/1996 | Sussman ................ 379/218.01 |
| 6,065,016 A | * | 5/2000 | Stuntebeck et al. ......... 707/200 |
| 6,125,287 A | * | 9/2000 | Cushman et al. ........... 455/566 |
| 6,459,497 B1 | * | 10/2002 | Kashiwazaki .............. 358/1.15 |
| 2002/0068599 A1 | * | 6/2002 | Rodriguez et al. .......... 455/550 |

FOREIGN PATENT DOCUMENTS

| EP | 0810538 A2 | * | 12/1997 | ........... G06F/11/00 |
| JP | 411328562 A | * | 11/1999 | ........... G06B/21/10 |
| KR | 2001069619 A | * | 7/2001 | ........... G06F/17/00 |

* cited by examiner

Primary Examiner—Melur Ramakrishnaiah
(74) Attorney, Agent, or Firm—Albert S. Michalik PLLC

(57) ABSTRACT

A method and system for providing access to emergency data. Emergency data is collected from various sources and maintained such that it can be efficiently recalled in an emergency. In one implementation, the data is maintained in XML documents. An emergency application program provides a page and/or sub-pages via which a user interacts to obtain the data. The data is typed according to types of emergencies to facilitate user access to the appropriate data when needed. The emergency data may be automatically loaded from a remote source, such as a .NET service, or provided by a retailer. Actions may be associated with emergency data, such as to provide an easy or automated way to send an alert, email message, and the like in the event of an emergency.

11 Claims, 7 Drawing Sheets

METHOD AND SYSTEM OF PROVIDING EMERGENCY DATA

FIELD OF THE INVENTION

The present invention relates generally to computer systems, and more particularly to data access via a computer system.

BACKGROUND OF THE INVENTION

People have come to depend on small, highly portable computing devices such as Pocket-sized personal computing devices. In general, various types of users have found these devices useful for things ranging from running fairly complex programs, such as to browse the web or access email, to simpler tasks such as storing contact information, keeping a schedule, and so forth. These devices thus hold a lot of information about users and other people they know.

However, when it comes to an emergency, these devices have a number of drawbacks, essentially because they are not engineered to expose needed emergency information in a comprehensive, and simple manner. For example, in an emergency situation, people are expected to access a significant amount of information from different sources, such as a phone number for road-side assistance, their vehicle's identification (VIN) number, insurance information, and licensing data. Other emergencies require other types of data, such as a doctor's telephone number, a credit card number, and so on. While even the most conscientious users may take the time to put such information in a computer system, they may not be able to pull the information together when needed.

In sum, what is needed is a way to provide users with access to needed emergency information. This should be simple from the user's perspective, so that even very emotional users can find what is needed in a straightforward, yet comprehensive process.

SUMMARY OF THE INVENTION

Briefly, the present invention provides a method and system for maintaining emergency data in a manner that provides straightforward user access thereto via a displayed emergency page (or set of pages) or other suitable user interface. In one embodiment, the operating system or other suitable components maintain a repository of emergency data such that emergency type information can be aggregated and displayed in one place.

Emergency data can be entered manually or via a communication mechanism connected to a remote source, such as a directly connected source, or one indirectly connected via the internet or the like. For example, the source may comprise a .NET service.

In one implementation, the source intentionally provides data that includes the emergency data, such as in a special XML document for emergency data, or by flagging certain pieces of data as being emergency-related. In another implementation, the device may abstract emergency data from other data without the source having knowledge that the data is emergency data.

When emergency data is needed, a user executes an emergency page application program that provides an emergency page, or the user otherwise selects the emergency page. User interaction with the page and any sub-pages linked thereto results in the system accessing, aggregating, and/or merging data based on a type of emergency, and then providing the data to the user. The emergency page application program may also perform some action or actions with respect to the emergency. For example, the emergency page application program can issue an alert to a remote data receiver, send an email message, place a telephone (e.g., "911") call, gather additional relevant data from the user or other device and/or perform other useful operations.

Other advantages will become apparent from the following detailed description when taken in conjunction with the drawings, in which:

DETAILED DESCRIPTION OF THE PREFERRED EMBODIMENT

Exemplary Operating Environment

Figure 1:
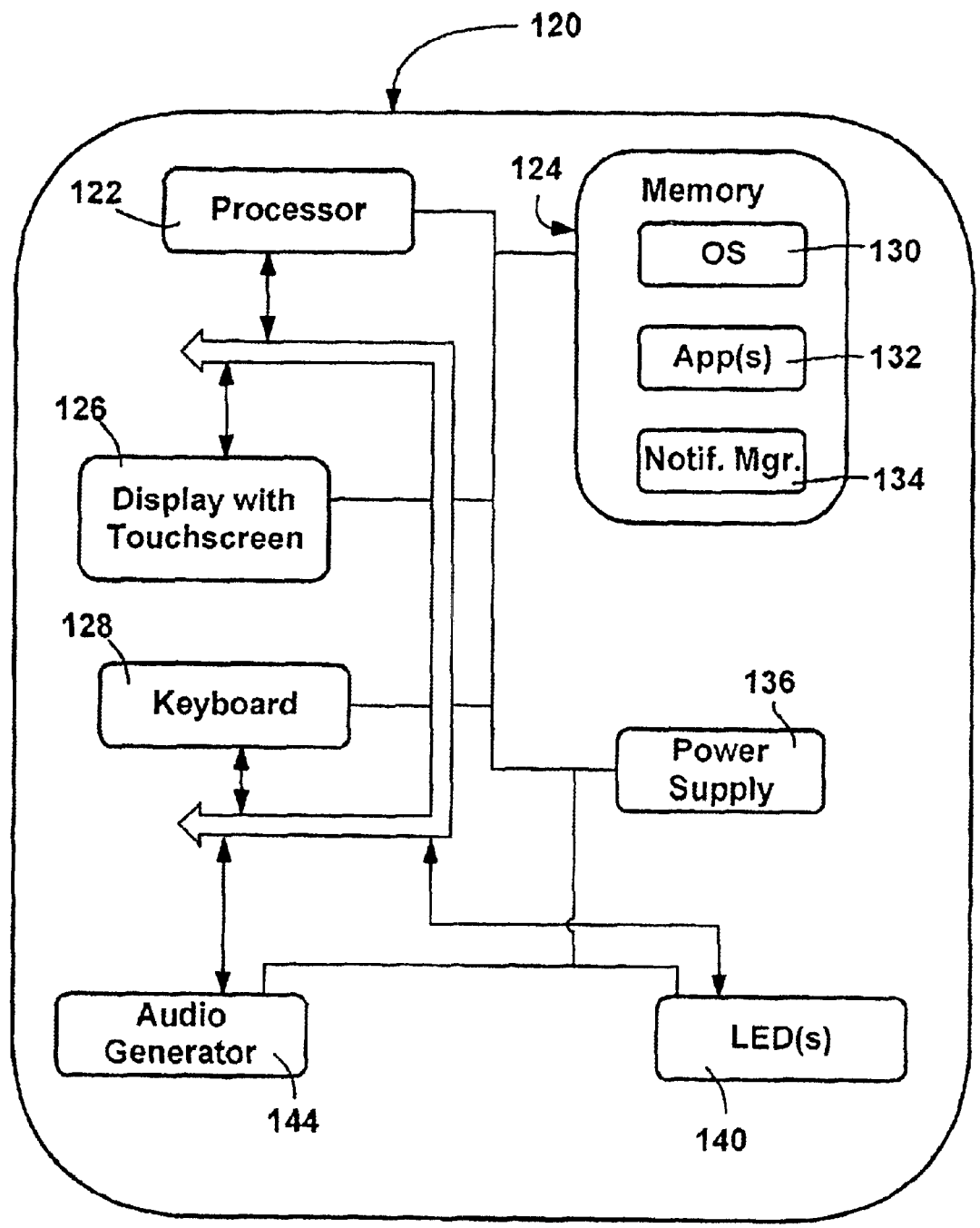
FIG. 1 is a block diagram representing a computer system into which the present invention may be incorporated.

FIG. 1 illustrates an example of a suitable operating environment 120 in which the invention may be implemented, particularly for decoding image and/or video data. The operating environment 120 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. For example, it is likely that encoding image and/or video image data often will be performed on a computer with more processing power than contemporary hand-held personal computers, but there is no reason encoding cannot be performed on the exemplary device, or decoding on a more powerful machine.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments.

Computing device 120 typically includes at least some form of computer readable media. Computer-readable media can be any available media that can be accessed by the computing device 120. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 120. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 120, including a processor 122, a memory 124, a display 126, and a keyboard 128 (which may be a physical or virtual keyboard). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® CE operating system from Microsoft® Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132.

The handheld personal computer 120 has a power supply 136, which is implemented as one or more batteries. The power supply 136 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 140 and an audio generator 144. These devices may be directly coupled to the power supply 136 so that when activated, they remain on for a duration dictated by a notification mechanism even though the handheld personal computer processor 122 and other components might shut down to conserve battery power. The LED 140 preferably remains on indefinitely until the user takes action. Note that contemporary versions of the audio generator 144 use too much power for today's handheld personal computer batteries, and so it is configured to turn off when the rest of the system does or at some finite duration after activation.

Emergency Page

Figure 2:
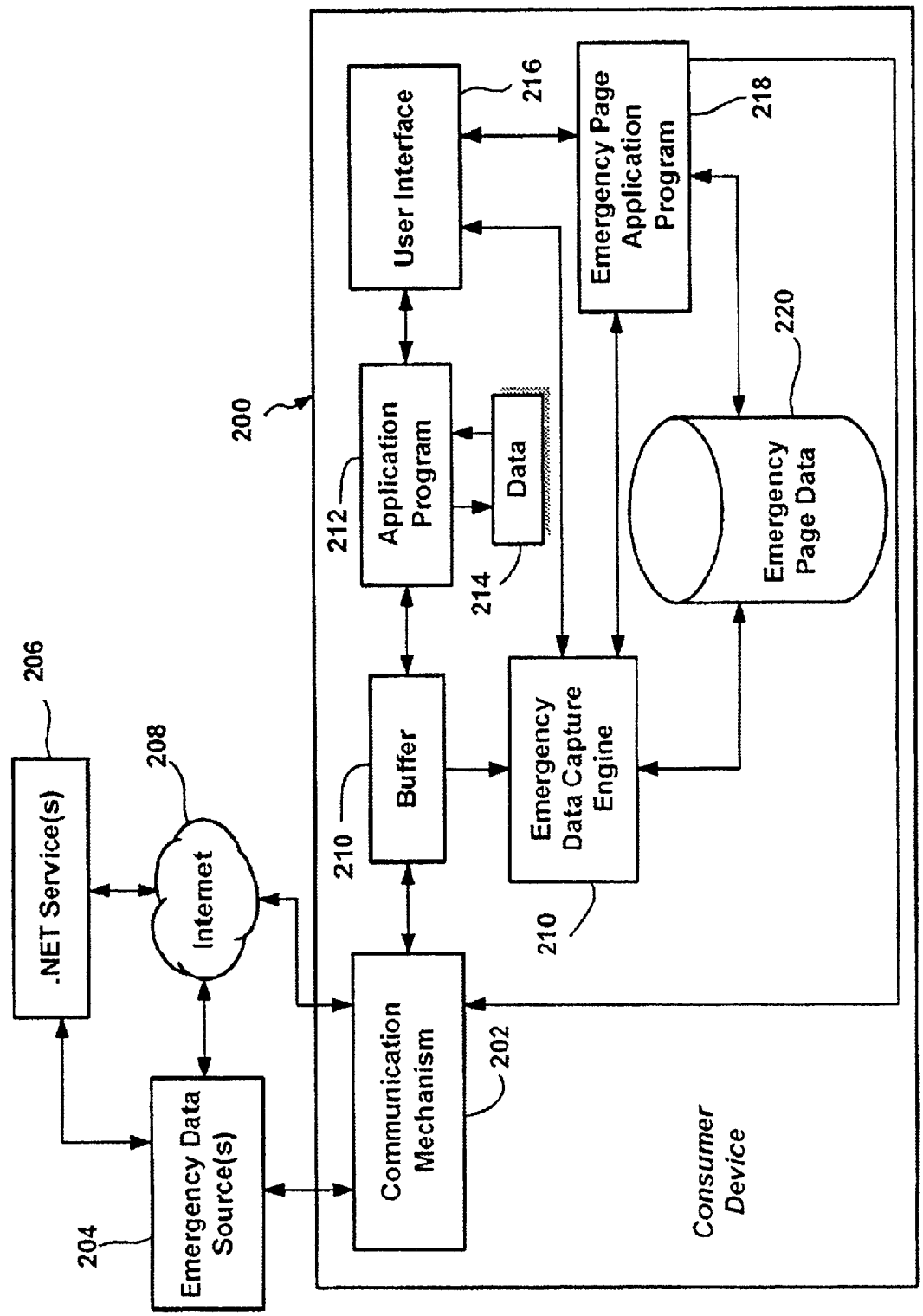
FIG. 2 is a block diagram representing components for implementing an emergency page in accordance with an aspect of the present invention.

FIG. 2 shows a block diagram including a consumer device 200 (such as the device 120 of FIG. 1) configured so as to be capable of providing an emergency page in accordance with one aspect of the present invention. As represented in FIG. 2, the computer system 200 (FIG. 1) preferably includes a communication mechanism 202 which can receive emergency data from a remote source 204. For example, a data source may comprise an infrared transmitter at a retailer's (e.g., rental car company) counter or kiosk, an automobile, a keycard, a website, and virtually anything capable of communicating information to the device 120.

The communication mechanism 202 can also receive emergency-related data from a .NET service 206 or the like (which may have also received it from the source 204) via the internet 208. As is known, .NET services provide identity-based data access for users, groups and other entities. For example, with .NET, a user can employ virtually any device capable of connecting to the Internet and running a .NET compatible application to access the user's data via .Net services. One of the .NET services may be arranged to provide emergency data, however as will be understood, the present invention can also interpret general data and determine that it is emergency data.

In one implementation, the communication mechanism 202 may receive and buffer (e.g., in the buffer 210) data on behalf of an application program 212 that knows nothing about emergency data. Instead, the application program maintains its own data such as in files or other data structures 214. Indeed, the data source 204 or .NET service also need not know that its data is emergency data. For example, an emergency data capture engine 210 can select data it thinks may be emergency related, such as data that matches a particular format, e.g., telephone numbers, names beginning with "Dr.", VIN numbers, and so on, and prompt the user via a user interface 216 as to whether the data is emergency, and if so, how it should be typed. Of course, a user may also input emergency data directly via the user interface, such as by executing an emergency page application program 218. Note that as used herein, the application program is not limited to a conventionally-thought of application program (such as one that executes over an operating system), but rather may comprise an operating system component, some script in a page that a browser may interpret, and/or virtually any other type of executable code.

In one preferred implementation, data may be tagged as emergency data by its source. For example, a rental car company may transmit information about a car that has been rented to a user to the user's device 200. Some or all of this data, such as the VIN number, emergency 800 number, and so on may be tagged, and preferably categorized so that when transmitted, it is known to be emergency data, and of a certain type. The emergency data capture engine 210 can thus quickly and automatically (without prompting) store the emergency data in an emergency page database 220 or the like. Note that the data need not be stored in the device, e.g., .NET may maintain this information for access via the Internet, however locally caching emergency data is beneficial in case the Internet is inaccessible. Further note that the emergency data capture engine and emergency data application program may be incorporated into the same component.

Figure 3:
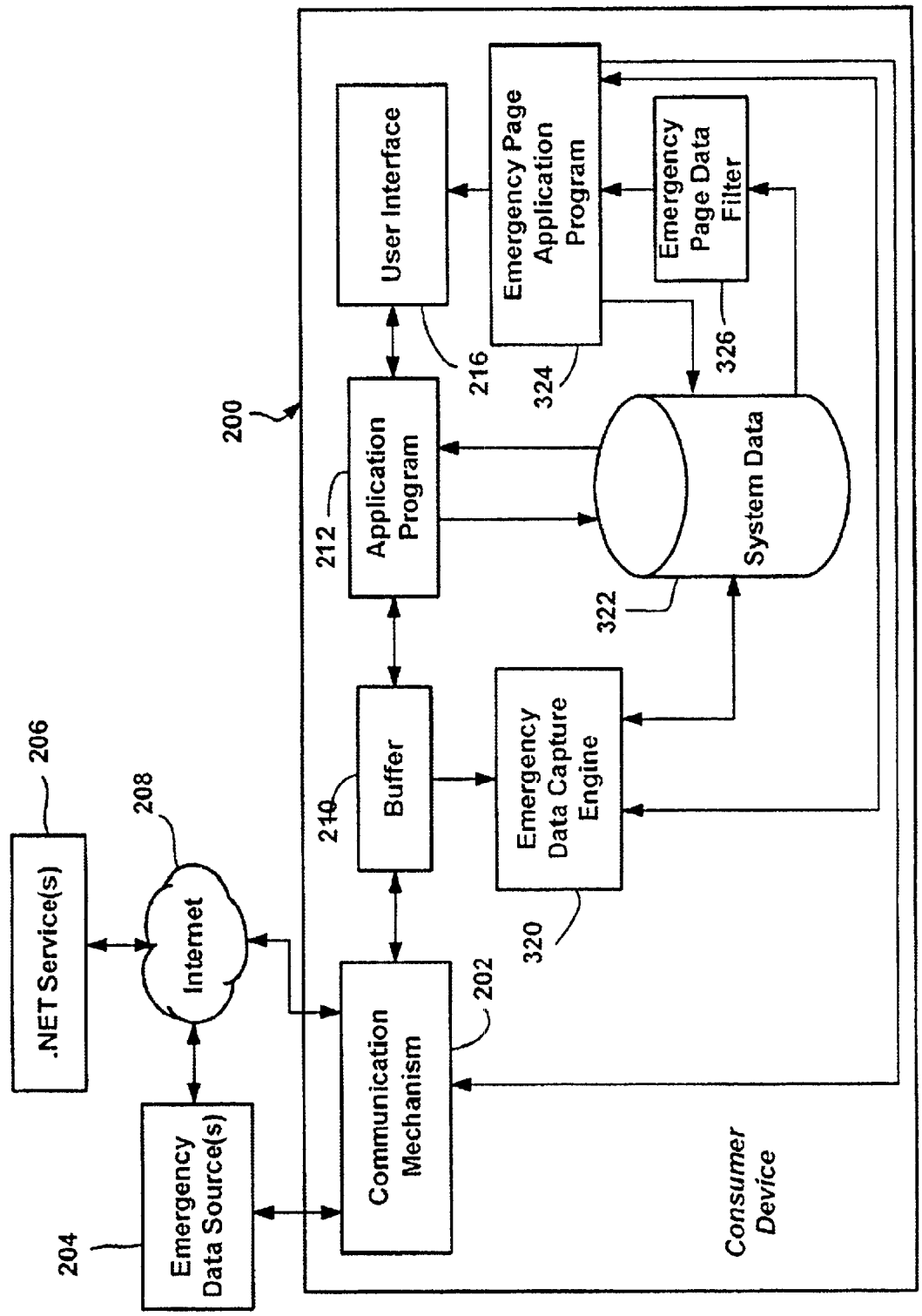
FIG. 3 is a block diagram representing components in an alternative arrangement for implementing an emergency page in accordance with an aspect of the present invention.

In an alternative embodiment represented in FIG. 3, the emergency page data can be stored with regular system data 322, but the emergency data capture engine 320 may tag it with an attribute or the like. Then, when needed by an emergency page application program 324, an emergency page data locator 326 (which may be incorporated in the emergency page application program 324) can select that which is tagged as emergency data, and/or also type the data dynamically. The emergency data capture engine 320 may maintain its own internal tables or the like to track the emergency data, type it, and so forth, whereby the locator 326 may access those tables. In any event, the device 200 includes components that can rapidly locate relevant emergency data for appropriate types of emergencies. Note that it is likely preferable to maintain emergency data separately from other data, however, so that it is not inadvertently deleted.

Returning to FIG. 2, a user can thus execute an emergency page application program 218 or the like to obtain needed emergency data relevant to a particular type of emergency. Moreover, the emergency page application program 216 can do more than display the data, in that the emergency page application program 216 can take some action with respect to the emergency. For example, the emergency page application program 218 can send an email message, place a telephone (e.g., "911") call, gather additional relevant data from the user or other device (such as from a vehicle's computer, a GPS system and so on) and/or perform other useful operations. To this end, the emergency page application program 218 is connected to the communication mechanism 202. The emergency page application program 218 also may invoke other application programs, such as one that interfaces with a car's computer to obtain relevant data in the event of a breakdown, e.g., for sending to a technician. Note that part of the emergency data can include data regarding appropriate actions to take.

Figure 4:
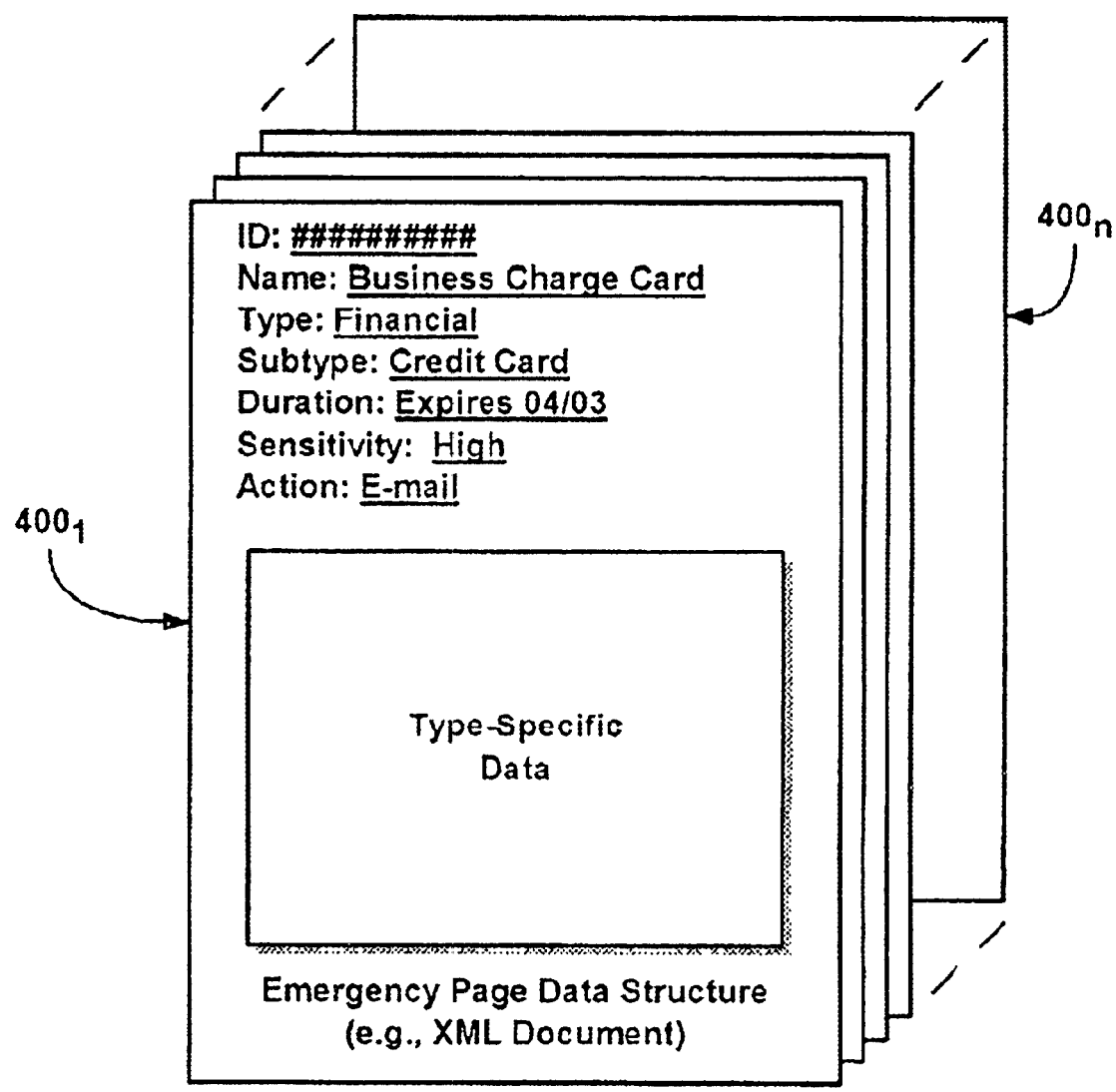
FIG. 4 is a representation of a suitable data structure such as an XML document that maintains emergency-related data in accordance with an aspect of the present invention.

FIG. 4 provides example data structures $400_1$–$400_n$ that hold the emergency data, such as in an XML (extensible Markup Language) document. For example, .NET uses XML documents to store, transfer, and otherwise provide users with access to appropriate data. Conventional objects and the like can also be used to store the data.

As generally represented in FIG. 4, each document may have an identifier (e.g., a UUID) associated with it, along with various other data that may or may not be present for a given data structure. For example, such useful information may include a name, type (and subtype) information, duration information, sensitivity information, and an action.

By way of example, one data structure $400_1$ may store emergency information related to a credit card. Such a data structure may be classified as corresponding to a financial-type emergency (e.g., lost or stolen card), a subtype of credit card (versus other financial-related emergencies such as locating a checking account number). A duration may be provided, which may be some date at which time the data is no longer considered valid. For example, for a credit card it may be the expiration date of the credit card, while for a rental car it may be two weeks after the car is scheduled to be returned. In this way, records can expire to reclaim storage space, reduce the risk of obsolete data, and so forth. The emergency application program or other utility can query (or otherwise search) to delete expired data structures.

Each data structure may also have a sensitivity setting, such as top secret, high, medium, low, public, and so on. Passwords, PIN numbers, and other methods may be used to control access. For example, a user might want credit card numbers to be known to the system, but be blocked from display or always encrypted, with an alert message sent to the credit card company if the card is lost or stolen. In this way, the credit card company can deactivate the card, but no one can ever see the actual card number. At the other end, a user who has medical problems might want some of his or her emergency medical information to be publicly available to any viewer in possession of the device, so that, for example, a paramedic could quickly look up any allergies to medications and the like of an unconscious user. Note that along these lines, if the user has a password 'lock' on the device, the device may be made configurable to provide some access to the emergency page, (i.e., with restricted information). For example, if the user is involved in some kind of accident, paramedics or others can get at some, but not all, emergency information about the user, without knowing the password for the device.

Each data structure may also have certain standard actions that the device can take, such as to send an alert to a remote data receiver, and/or send an email message, page someone, place a telephone call, and so on.

The data structure also may contain type-specific information. For example, for a credit card structure, the type-specific information may include the credit card number, card issuer name, telephone number, expiration date, email or website address and so forth. Note that the data for multiple records may be maintained in the same data structure, and/or multiple data structures can be returned in an appropriate (e.g. type/subtype) query when needed. Also, the information needed to take an action, such as the text and/or code of a message to send, may be stored in this section.

Figure 5:
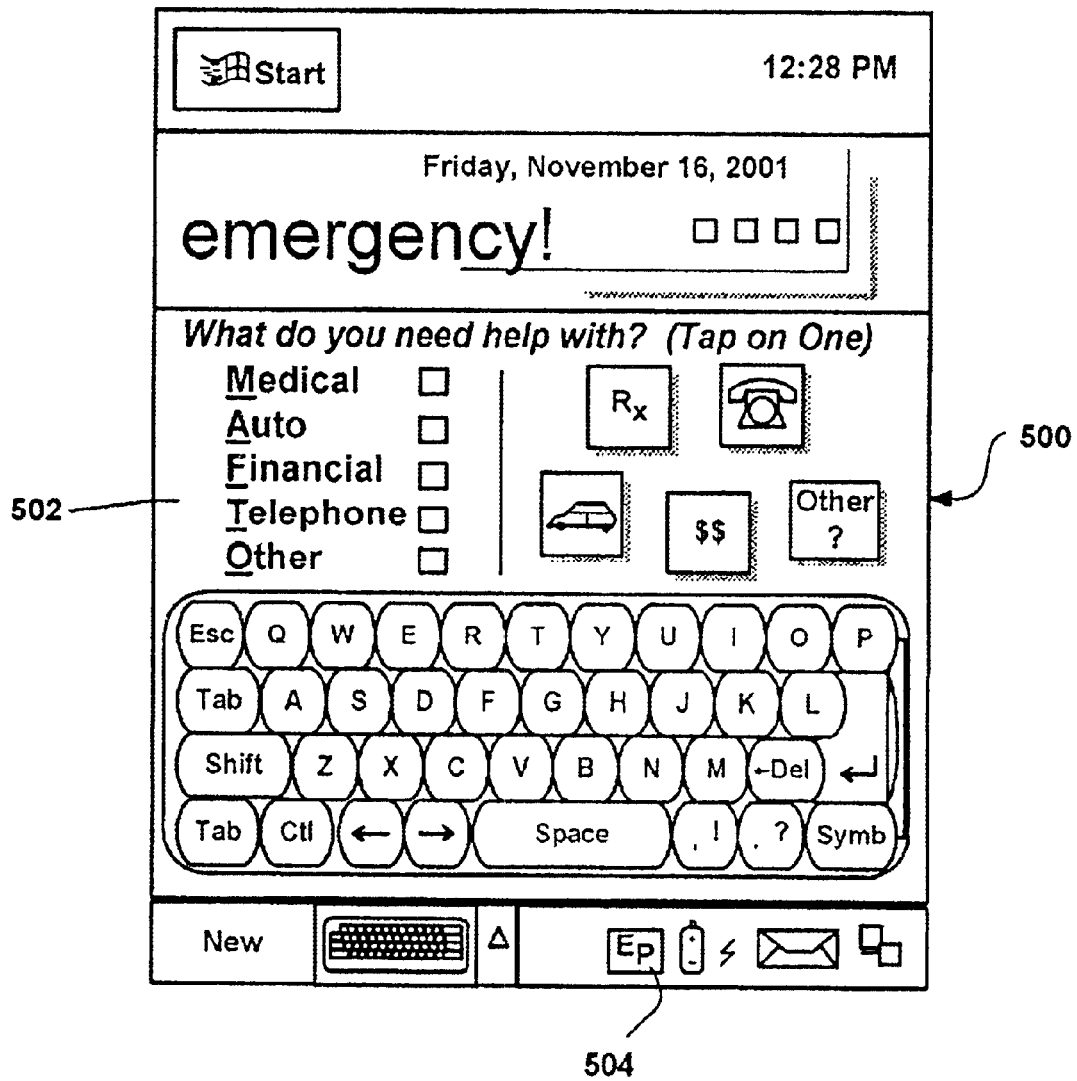
FIG. 5 is a representation of an initial emergency page displayable to a user to facilitate simple and rapid access to the emergency-related data.

FIG. 5 represents an example user interface 500 including an emergency page 502 that a user receives when the emergency page application is run. As is known, the application may be run in any number of ways, such as via the start menu, by accessing the page through a browser, by clicking an icon 504 in a system tray or the like, and so on. As part of its execution, the application program causes the emergency page, and possibly child pages, to be rendered. It should be noted that the present invention is not limited to displayable pages, but indeed, may use voice recognition and/or audio playback to handle the emergency data input and/or output, such as for visually impaired users.

In keeping with the present invention, when executed, the emergency page application program initially displays, via the user interface 500, very straightforward links or the like that a user can select. This enables a user to obtain needed emergency data without a lot of thought. Less critical information and functions may be accessed by an "Other" link or the like. For example, a user might use such a link to locate an input screen for manually entering emergency data.

When a link is selected, relevant sub-selections (pages) may appear. For example, an "automobile"-like link may provide the user with a page that enables a choice of vehicles, if the user has emergency data for more than one vehicle stored in the device. For credit cards, the user may receive a sub-page that allows one or more cards to be selected, or even all cards at once, so that, for example, one can be canceled/reissued if only one is lost, or all if a purse or wallet is stolen.

Figure 6:
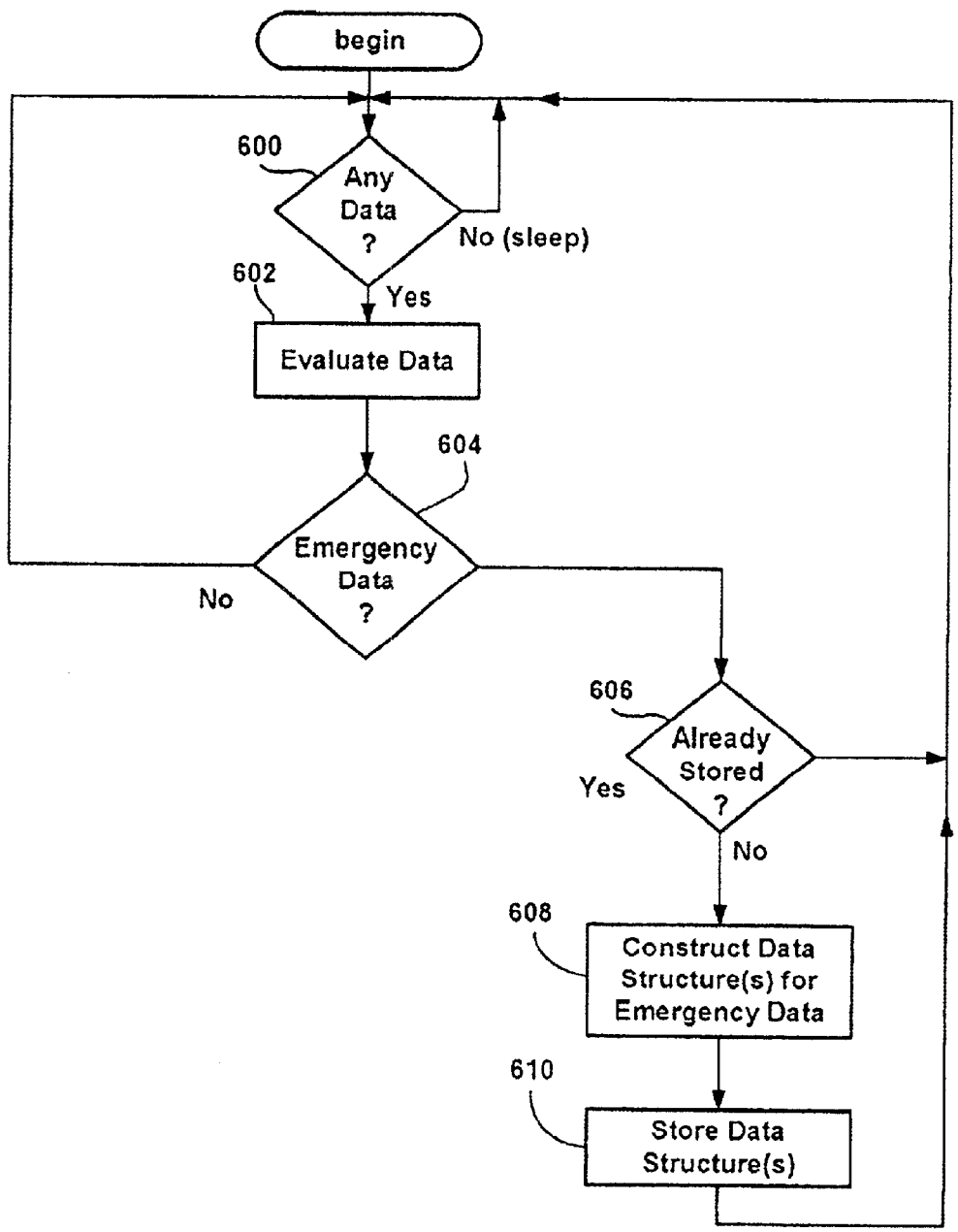
FIG. 6 is a flow diagram describing general logic for storing emergency-related data in accordance with an aspect of the present invention.
Figure 7:
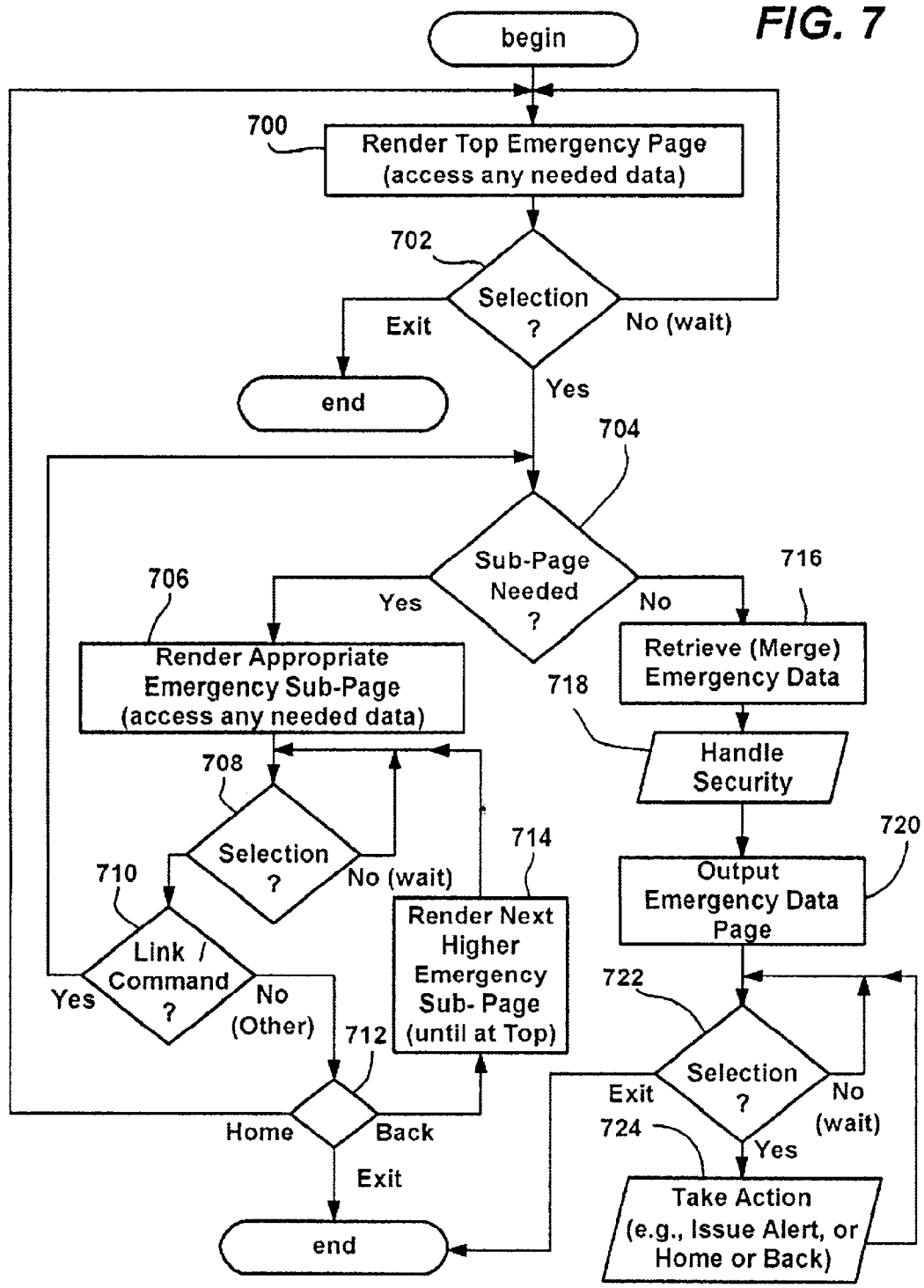
FIG. 7 is a flow diagram describing general logic for providing emergency-related data in accordance with an aspect of the present invention.

By way of summary, FIGS. 6 and 7 provide an explanation of the operation of the present invention. As represented in FIG. 6, at step 600, the process (e.g., the emergency data capture engine) waits for some data to be made available. Step 602 represents evaluating this data, such as to see whether the data is tagged as emergency data, or matches a pattern such that a user may be prompted to decide whether to store it as such.

If data is deemed to be emergency-related data at step 604, step 606 is executed to determine whether the data is already stored as emergency data so as to not unnecessarily store it multiple times. Note that in a database operation, this may be automatically handled by an insert operation or the like that does not add duplicate records; however, in an environment where some user prompting is needed to determine whether and/or how to store emergency data, before prompting, the emergency data capture engine may first query for the existence of such data, so as to avoid unnecessarily interrupting the user.

If not already stored, step 608 represents constructing the data structure or structures (e.g., an XML document) needed to maintain this data, prompting the user if necessary. Note that in one preferred implementation, the source of the data can tag the data as emergency data, type the data, indicate that it should overwrite other data that may exist with superseding data, and so on. Some authentication (e.g., a certificate) may be used to ensure that a source can only overwrite its own emergency data, or certain types of it, and so on. In any event, step 610 represents storing the data structure or structures.

FIG. 7 is directed to the emergency page application program that recalls the data when needed, beginning at step 700 which represents rendering the topmost (e.g., home) emergency page. Note that this rendering may be simply interpreting static data, but may instead perform some dynamic processing, such as to not display a "financial" link on the emergency page when the user has no financial-related emergency data stored in the device or otherwise accessible. Thus, some data access may occur as part of rendering the topmost emergency page.

Step 702 represents waiting for a user selection. Note that this may be event driven, but is represented as a loop for purposes of simplicity. Further, given the importance of such a program, the selection step may actually loop and/or execute in a critical section so that a user is not confused by other user-interface activities (e.g., pop-up reminders and the like) that may coincidentally appear at any given moment. In general, a user may exit (cancel) the emergency page screen, although an "Are you sure" prompt or the like may be provided to handle situations wherein a user has tapped the wrong location.

Step 704 represents a next evaluation being executed when a valid link or the like is actuated at step 702, to render an appropriate sub-page. For example, a user may select a general financial emergency via step 702, but that may result in a more focused financial emergency page being needed, such as to allow selection of one or more various credit cards. Note that security (e.g., a password) may be required before any sub-page (or even the home emergency page) is rendered, although for simplicity herein, any security is described as being handled before retrieving and displaying the data, rather than when a page directed to user selection input is rendered.

If a sub-page is needed, step 706 renders the sub-page, which includes any needed data access, while step 708 waits for a user selection via that page. Steps 710 and 712 represent some or all of the types of selections that a user may select. For example, a user may click on a page-specific link command, such as to select a given credit card name, a "cancel all cards" command button, and so on. If so, the process returns to step 704 to see if a sub-page is needed for this selection. If not, step 712 represents general navigational commands, such as "Home" (which if actuated will return to step 700), "Back" (which if actuated will render an appropriate higher page at step 714), or "Exit" (which will exit the program, possibly following a confirmation prompt).

Ultimately, at step 704, a user selection will be one that requires no sub-pages. In keeping with the present invention, preferably this will not be too many levels below the home page, and may even be one level below if no sub-page is needed. Step 716 represents retrieving the appropriate records for the page, merging any data as necessary. For example, for a car problem, a user may have an insurance company's telephone number in both a rental car's data structure and in a personal car's data structure, and there would not be any reason to display it twice. However, VIN information would vary by the car.

Step 718 represents the handling of security, if any, before displaying the data, such as requiring a pin number, password, and so on, e.g., in accordance with sensitivity settings on the data. The highest sensitivity setting may control the security, or security may be per data piece or data structure, e.g., so as to not prevent a user from seeing telephone numbers of credit card companies when the user cannot remember a password or PIN required to see a credit card number. Note that in addition to prompting for and/or evaluating user input data, handling security includes allowing the user to back out, start over, end the process and so on, and indeed, security can end the process to hinder its evasion, e.g., start over if a password is incorrectly entered some number of times.

When security, if any, is cleared, step 720 represents outputting the emergency data. Step 722 represents waiting for a user selection, such as to exit, or take some action, including navigation actions (home or back) as described above. Step 724 represents taking the appropriate action, which may, for example, include issuing an alert, sending an email message, dialing a telephone number and/or placing a pre-recorded call or page, and so on. Note that any user selection may come after an action is automatically taken.

It should be noted that while the steps represented in FIG. 7 provide an application program with significantly flexible programming and various selectable levels of sophistication, from a user's perspective the interaction is simple, and may be very streamlined. For example, the top-level page or first sub-page may contain the information a user needs, without any security concerns, in which event a user could obtain needed emergency data and even take action with as little as one or two taps on the screen (or voice commands). For example, this would seem particularly valuable with types of emergencies predicted to be more serious, such as those related to a medical emergency. On the other hand, a user may need (and want) to navigate through several levels of pages, with security constraints required to be met, to obtain other data.

As can be seen from the foregoing detailed description, there is provided an improved method system for providing access to emergency data via a computer system. The method and system are flexible, such as to allow tradeoffs between usability and security, and extensible, such as to allow different types of data to be stored as emergency data.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method, comprising:
maintaining a plurality of records in an emergency data store, each record comprising emergency data and having type of emergency information associated therewith that classifies the record as corresponding to at least one type of emergency;
providing an emergency page, the emergency page including a plurality of emergency type links, each emergency type link corresponding to a particular type of emergency;

receiving an indication that an emergency type link was actuated, and in response, accessing the emergency data store to locate at least two records that are each associated with the type of emergency that corresponds to the actuated link;

aggregating the data from each located record into aggregated emergency data; and providing an emergency sub-page based on the aggregated emergency data.

2. The method of claim 1 further comprising merging data from each located record that is repeated.

3. The method of claim 1 wherein providing an emergency sub-page comprises providing at least one sub-link to another emergency sub-page.

4. The method of claim 3 wherein at least one sub-link corresponds to a sub-type associated with a record.

5. The method of claim 1 further comprising, evaluating duration information maintained with at least one record to determine whether to delete that record.

6. The method of claim 1 wherein providing an emergency sub-page comprises displaying at least some emergency data.

7. The method of claim 1 further comprising, obtaining action information from at least one of the records and taking an action based on the action information.

8. The method of claim 1 further comprising, requesting and verifying security information prior to providing the emergency sub-page.

9. The method of claim 8 further comprising evaluating sensitivity data in at least one of the records prior to requesting and verifying the security information.

10. The method of claim 1 further comprising receiving emergency data from a remote source for maintaining in the data store.

11. A computer-readable medium having computer-executable instructions for performing the method of claim 1.

* * * * *